(12) United States Patent
Lin et al.

(10) Patent No.: US 11,814,093 B2
(45) Date of Patent: Nov. 14, 2023

(54) TELESCOPIC CART

(71) Applicant: Yeou Ghi Industry Co., Ltd., Douliou (TW)

(72) Inventors: Ming-Hsien Lin, Douliou (TW); Ho-Tsang Li, Douliou (TW); Guan-Ting Lin, Douliou (TW)

(73) Assignee: Yeou Ghi Industry Co., Ltd., Douliou (TW)

( * ) Notice: Subject to any disclaimer, the term of this patent is extended or adjusted under 35 U.S.C. 154(b) by 254 days.

(21) Appl. No.: 17/474,154

(22) Filed: Sep. 14, 2021

(65) Prior Publication Data
US 2022/0348243 A1 Nov. 3, 2022

(30) Foreign Application Priority Data
Apr. 28, 2021 (TW) .................................. 110115367

(51) Int. Cl.
*B62B 1/12* (2006.01)
*B62B 5/06* (2006.01)

(52) U.S. Cl.
CPC ................ *B62B 1/125* (2013.01); *B62B 5/06* (2013.01)

(58) Field of Classification Search
CPC .................................. B62B 1/125; B62B 5/06
See application file for complete search history.

(56) References Cited

U.S. PATENT DOCUMENTS

| | | | | |
|---|---|---|---|---|
| 1,524,563 A * | 1/1925 | Lang | ........................ | B62B 13/06 280/8 |
| 3,064,989 A * | 11/1962 | Bellows | ................... | B62B 1/002 280/47.18 |
| 6,328,319 B1 * | 12/2001 | Stahler, Sr. | ............... | B62B 1/12 280/47.27 |
| 6,345,829 B1 * | 2/2002 | Mueller | ............... | B23D 47/025 280/47.28 |
| 11,001,285 B1 * | 5/2021 | Gayk | ....................... | B62B 1/002 |
| 2006/0157944 A1 * | 7/2006 | Alexander | .............. | B62B 1/125 280/47.18 |
| 2015/0251678 A1 * | 9/2015 | Bruno | ..................... | B62B 1/208 280/645 |
| 2021/0212510 A1 * | 7/2021 | Hunt | ..................... | F24C 15/086 |
| 2021/0212511 A1 * | 7/2021 | Hunt | ................... | A47J 37/0763 |

* cited by examiner

*Primary Examiner* — Bryan A Evans (57) ABSTRACT

A telescopic cart includes a storage unit, a support unit, a positioning unit, a pressing control handle, a limit unit, and a handle. The support unit includes a first supporting frame and a second supporting frame which are pivotally connected. The first supporting frame is pivotally connected with the storage unit. The second supporting frame is slidably connected with the storage unit. The positioning unit is used to position the first supporting frame and the second supporting frame without different angles defined therebetween, so that the storage unit is located at different height.

3 Claims, 11 Drawing Sheets

TELESCOPIC CART

BACKGROUND OF THE INVENTION

1. Field of the Invention

The present invention relates to a working assistance device and, more particularly, to a telescopic cart.

2. Description of the Related Art

A tool cart is used to place or store hand tools or parts when an operator is working or assembling a mechanic device. However, a conventional tool cart has a fixed height that cannot be adjusted according to the statures of different users, thereby easily causing inconvenience to the users when needing to take the items placed on the tool cart. In addition, the user may have to keep different positions, such as standing, sitting or squatting, during the working process so that the fixed height of the conventional tool cart cannot satisfy the requirement of the user at different positions.

BRIEF SUMMARY OF THE INVENTION

The primary objective of the present invention is to provide a telescopic cart having a height that is adjusted according to the user's requirement.

In accordance with the present invention, there is provided a telescopic cart comprising a storage unit, a support unit, a positioning unit, a pressing control handle, a limit unit, and a handle. The storage unit includes a storage body, two rails, a base plate, a control button, and a torsion spring. The storage body is provided with two insertion holes and two receiving grooves. The two receiving grooves are located adjacent to the two insertion holes respectively. Each of the two receiving grooves is provided with two cavities which are in line with one of the two insertion holes. The storage body has a top provided with a plurality of storage portions and a bottom provided with a bottom channel. The two rails are secured to the bottom channel. Each of the two rails includes a main section and a secondary section extending from a top of the main section. A predetermined angle is defined between the main section and the secondary section. The main section is provided with a slideway. The secondary section is provided with a plurality of locking grooves extending in a lengthwise direction of the slideway. The base plate is secured in the bottom channel. The control button is pivotally connected with the base plate. The control button is provided with a recess. The torsion spring is biased between the base plate and the control button. The support unit includes a first supporting frame, a second supporting frame, a sliding rod, two connecting rods, and two mounting rods. The first supporting frame and the second supporting frame are pivotally connected. The first supporting frame has a top pivotally connected with the two rails. The sliding rod extends through a top of the second supporting frame and is inserted into the slideway of each of the two rails. One of the two connecting rods is pivotally connected with the first supporting frame, and the other one of the two connecting rods is pivotally connected with the second supporting frame. Each of the two connecting rods is provided with a plurality of casters. The two mounting rods are arranged telescopically. Each of the two mounting rods is secured to one of the two connecting rods. The positioning unit includes two positioning pieces, two driving pieces, two guide shafts, two transmission shafts, a linking lever, and two positioning springs. Each of the two positioning pieces is arranged beside one of the two rails. Each of the two positioning pieces is provided with a shaft hole, a first through hole, and a limit slot which are arranged serially. Each of the two positioning pieces has an upper edge provided with at least one locking tooth. Each of the two guide shafts extends through the shaft hole of one of the two positioning pieces and is inserted into the slideway of one of the two rails. The sliding rod extends through the limit slot of each of the two positioning pieces. The limit slot of each of the two positioning pieces has a length more than the diameter of the sliding rod. Each of the two driving pieces is arranged beside one of the two positioning pieces. Each of the two driving pieces is provided with a second through hole, an aperture, and a mounting hole which are arranged serially. Each of the two transmission shafts extends through the second through hole of one of the two driving pieces and the first through hole of one of the two positioning pieces. The sliding rod extends through the aperture of each of the two driving pieces. The linking lever has two ends secured in the mounting hole of each of the two driving pieces respectively. Each of the two positioning springs is mounted on the sliding rod and has a first end pressing an upper edge of one of the two driving pieces and a second end pressing a top of the bottom channel. Each of the two positioning springs applies an elastic force which forces the at least one locking tooth of each of the two positioning pieces into the locking grooves of one of the two rails to position the support unit. The pressing control handle is pivotally mounted in the bottom channel of the storage body and extends between the sliding rod and the linking lever. The linking lever presses the pressing control handle downward so that the pressing control handle is locked into the recess of the control button. The limit unit includes two locking plates and two fixed plates. Each of the two locking plates has an end provided with a locking portion and has a bottom provided with a flange. Each of the two locking plates is mounted in one of the two receiving grooves of the storage body. The flange of each of the two locking plates is locked in one of the two cavities of one of the two receiving grooves. Each of the two fixed plates is secured on the top of the storage body and presses one of the two locking plates. Each of the two fixed plates is provided with a passage aligning with one of the two insertion holes of the storage body. The handle includes a U-shaped grip portion. The grip portion has an outside provided with a plurality of locking holes. The grip portion has two ends each extending through the passage of one of the two fixed plates and inserted into one of the two insertion holes of the storage body. The locking portion of each of the two locking plates is locked into one of the locking holes of the grip portion.

In practice, the storage portions of the storage unit are used to place or store articles. When the pressing control handle is locked in the recess of the control button, the at least one locking tooth of each of the two positioning pieces is locked in the locking grooves of one of the two rails, so that the first supporting frame and the second supporting frame are positioned with a determined angle therebetween, and the storage unit is located at a determined height.

In addition, when the user wishes to adjust the height of the storage unit, the control button is pushed inward so that the pressing control handle is detached from the recess of the control button. Then, the pressing control handle is pushed upward, so that the linking lever and each of the two driving pieces are driven to pivot about the sliding rod served as a fulcrum, and each of the two positioning pieces is driven to pivot about each of the two guide shafts served as a fulcrum, so that the locking teeth of each of the two positioning pieces are detached from the locking grooves of one of the two rails. Thus, the angle between the first supporting frame and the second supporting frame is adjusted freely to lift or lower the storage unit. After the storage unit is lifted or lowered to the required height, the pressing control handle is released and locked into the recess of the control button again, while the locking teeth of each of the two positioning pieces are locked into the locking grooves of one of the two rails again. Thus, the positioning unit is locked onto the storage unit to position the support unit.

Further, the locking portion of each of the two locking plates is locked one of the locking holes of the grip portion, so that the handle is located at different height relative to the storage unit.

Further, the height of the telescopic cart is adjusted according to the user's requirement. Thus, the first supporting frame and the second supporting frame are positioned with different angles defined therebetween, to adjust the height of the storage unit, thereby facilitating the users of different height taking the items placed on the storage unit at different working positions.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-6, a telescopic cart in accordance with the preferred embodiment of the present invention comprises a storage unit (or shelf or platform) 1, a support unit 2, a positioning unit 3, a pressing control handle (or bracket or bar) 4, a limit unit 5, and a handle 6.

The storage unit 1 includes a storage body (or placement member) 11, two rails 12, a base plate 13, a control button (or lever) 14, and a torsion spring 15. The storage body 11 is provided with two insertion holes 111 and two receiving grooves 112. Each of the two insertion holes 111 penetrates the storage body 11 from top to bottom. The two receiving grooves 112 are located adjacent to the two insertion holes 111 respectively. Each of the two receiving grooves 112 is provided with two cavities 113 which are in line with one of the two insertion holes 111. The storage body 11 has a top provided with a plurality of storage portions 114 and a bottom provided with a bottom channel 115. The bottom channel 115 extends to two ends of the storage body 11. The two rails 12 are secured to two sides of the bottom channel 115 and arranged symmetrically. Each of the two rails 12 includes a main section 121 and a secondary section 122 extending from a top of the main section 121. A predetermined angle (or right angle) is defined between the main section 121 and the secondary section 122. The main section 121 is provided with a slideway 123 penetrating the main section 121. The secondary section 122 is provided with a plurality of locking grooves 124 penetrating the secondary section 122 and extending in a lengthwise direction of the slideway 123. The base plate 13 is secured in the bottom channel 115. The control button 14 is pivotally connected with the base plate 13. The control button 14 is provided with a recess 141. The torsion spring 15 is biased between the base plate 13 and the control button 14.

The support unit 2 includes a first supporting frame (or rack) 21, a second supporting frame (or rack) 22, a sliding rod (or lever) 23, two connecting rods 24, and two mounting rods (or tubes or braces) 25. The first supporting frame 21 and the second supporting frame 22 intersect each other and are pivotally connected at middle positions thereof. The first supporting frame 21 has a top pivotally connected with the two rails 12. The sliding rod 23 extends through a top of the second supporting frame 22 and is inserted into the slideway 123 of each of the two rails 12. In the preferred embodiment of the present invention, the diameter of the sliding rod 23 is equal to the width of the slideway 123 of each of the two rails 12. The sliding rod 23 has two ends each inserted into the slideway 123 of one of the two rails 12. The two connecting rods 24 are disposed at a horizontal state. One of the two connecting rods 24 is pivotally connected with a bottom of the first supporting frame 21, and the other one of the two connecting rods 24 is pivotally connected with a bottom of the second supporting frame 22. Each of the two connecting rods 24 is provided with a plurality of casters 26. The two mounting rods 25 are arranged telescopically. Each of the two mounting rods 25 is secured to the middle of one of the two connecting rods 24. One of the two mounting rods 25 is provided with a plurality of pin holes 252, and the other one of the two mounting rods 25 is provided with a detachable pin 251 selectively extending through one of the pin holes 252.

Figure 11:
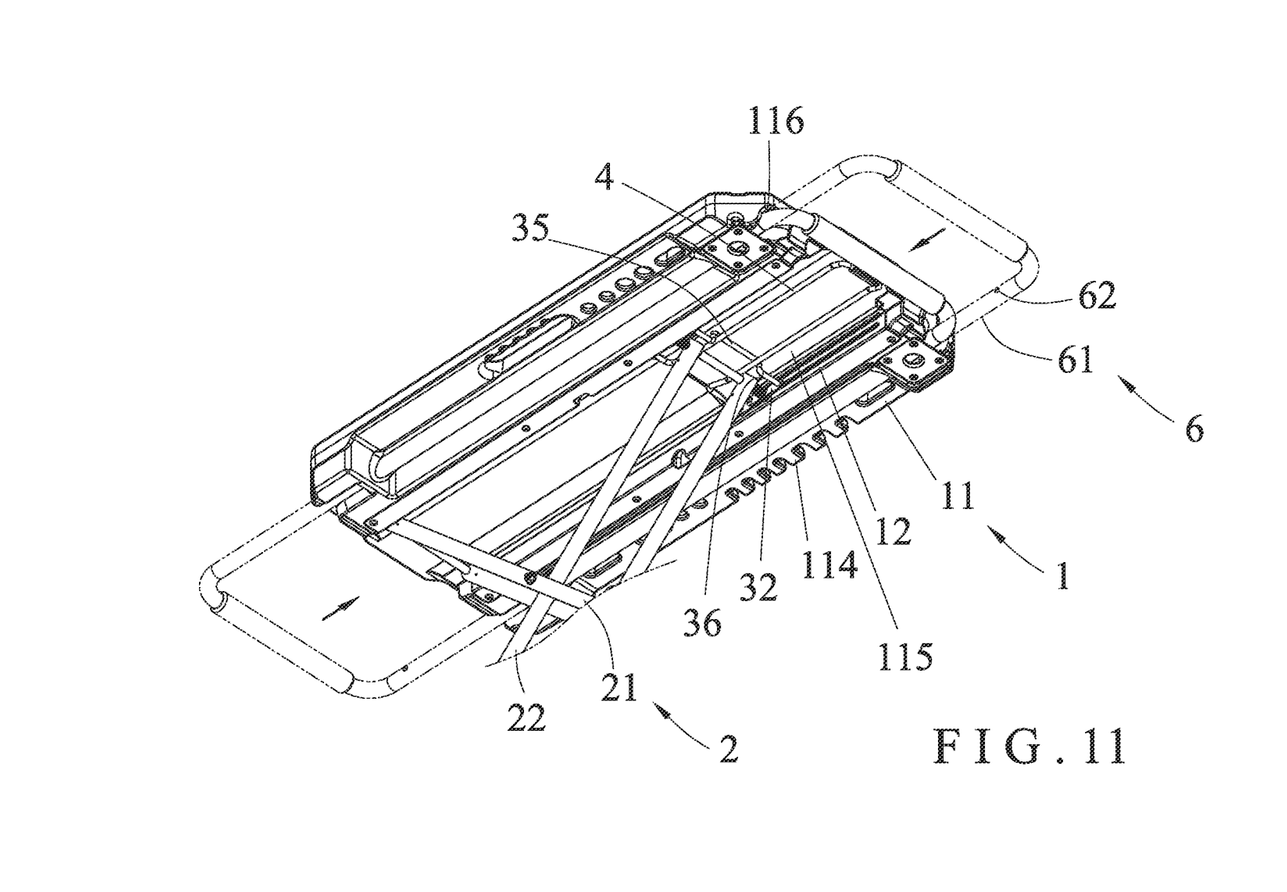
FIG. 11 is a partial perspective view showing that the handle is inserted into the two storage holes.

The positioning unit 3 includes two positioning pieces 31, two driving pieces 32, two guide shafts 33, two transmission shafts 34, a linking lever 35, and two positioning springs 36. Each of the two positioning pieces 31 is arranged beside one of the two rails 12. Each of the two positioning pieces 31 is provided with a shaft hole 311, a first through hole 312, and a limit slot 313 which are arranged serially. Each of the two positioning pieces 31 has an upper edge provided with at least one locking tooth 314. Preferably, each of the two positioning pieces 31 is provided with a plurality of locking teeth 314. Each of the two guide shafts 33 extends through the shaft hole 311 of one of the two positioning pieces 31 and is inserted into the slideway 123 of one of the two rails 12. The sliding rod 23 extends through the limit slot 313 of each of the two positioning pieces 31. The limit slot 313 of each of the two positioning pieces 31 has a length more than the diameter of the sliding rod 23 to limit the swinging angle of each of the two positioning pieces 31. Each of the two driving pieces 32 is arranged beside one of the two positioning pieces 31. Each of the two driving pieces 32 is provided with a second through hole 321, an aperture 322, and a mounting hole 323 which are arranged serially. Each of the two transmission shafts 34 extends through the second through hole 321 of one of the two driving pieces 32 and the first through hole 312 of one of the two positioning pieces 31. The sliding rod 23 extends through the aperture 322 of each of the two driving pieces 32. Thus, the sliding rod 23 functions as a fulcrum so that each of the two driving pieces 32 is pivoted (or swung) upward and downward about the sliding rod 23, and drives each of the two positioning pieces 31. The linking lever 35 has two ends secured in the mounting hole 323 of each of the two driving pieces 32 respectively. Each of the two positioning springs 36 is mounted on the sliding rod 23 and has a first end pressing an upper edge of one of the two driving pieces 32 and a second end pressing a top of the bottom channel 115 as shown in FIG. 11. Each of the two positioning springs 36 applies an elastic force which forces and locks the at least one locking tooth 314 of each of the two positioning pieces 31 into the locking grooves 124 of one of the two rails 12 so that the positioning unit 3 is locked onto the storage unit 1 to position the support unit 2.

Figure 2:
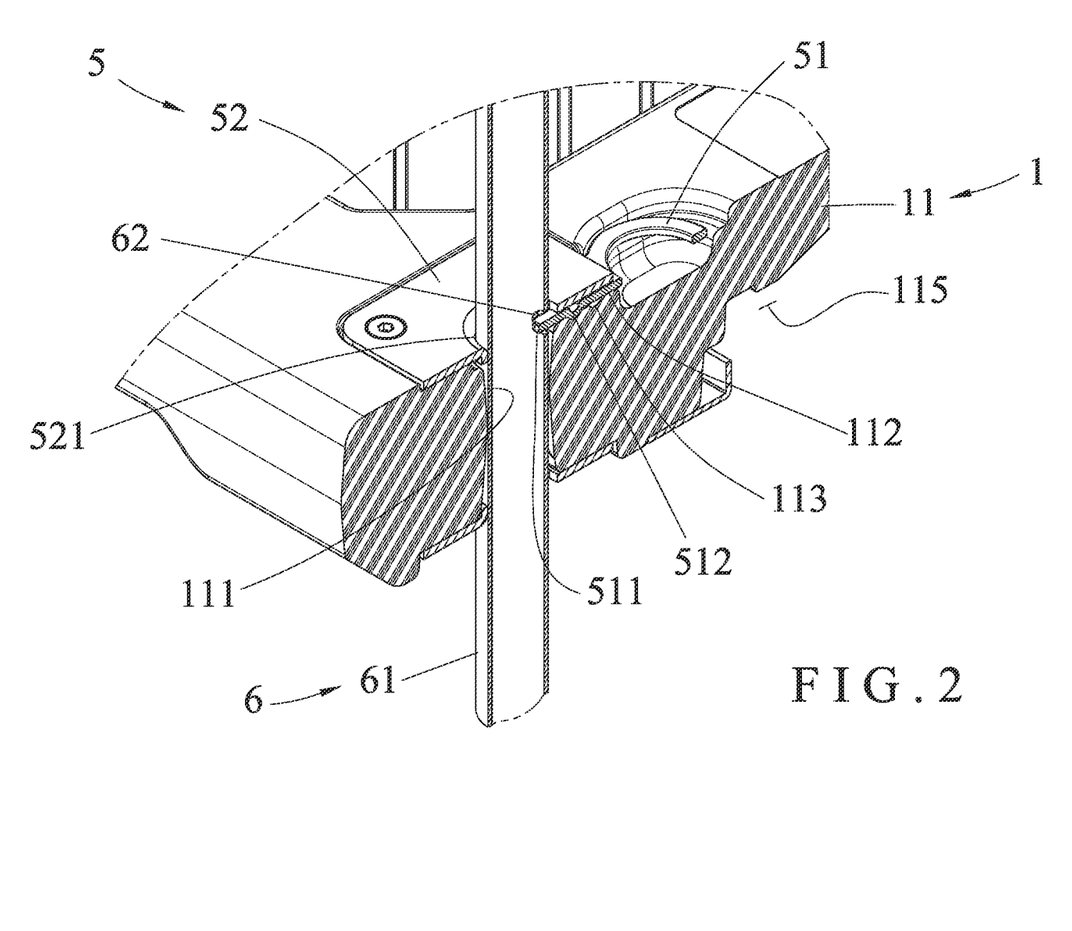
FIG. 2 is a partial perspective cross-sectional view of the telescopic cart in accordance with the preferred embodiment of the present invention.
Figure 6:
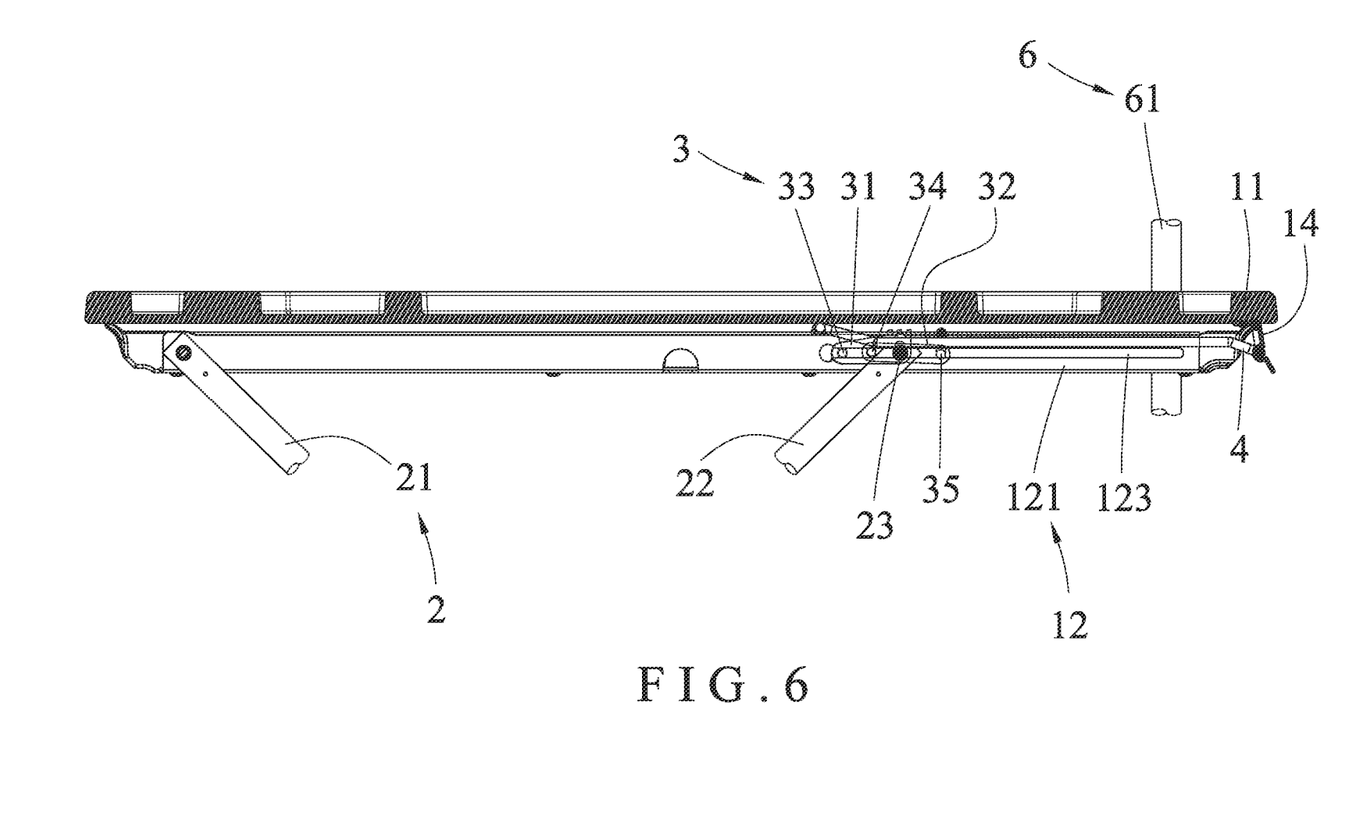
FIG. 6 is a partial cross-sectional view of the telescopic cart in accordance with the preferred embodiment of the present invention.

The pressing control handle 4 is pivotally mounted in the bottom channel 115 of the storage body 11 and extends between the sliding rod 23 and the linking lever 35. The linking lever 35 presses the pressing control handle 4 downward so that the pressing control handle 4 is locked into the recess 141 of the control button 14. Thus, when the pressing control handle 4 is pivoted upward, the linking lever 35 is pushed upward and drives each of the two positioning pieces 31 so that the at least one locking tooth 314 of each of the two positioning pieces 31 is moved and detached from the locking grooves 124 of one of the two rails 12. In practice, the pressing control handle 4 is releasably locked in the recess 141 of the control button 14. Thus, when the pressing control handle 4 is locked in the recess 141 of the control button 14, the at least one locking tooth 314 of each of the two positioning pieces 31 is locked in the locking grooves 124 of one of the two rails 12.

In practice, operation of the positioning unit 3 is described as follows. When the linking lever 35 is moved upward, each of the two driving pieces 32 is driven by the linking lever 35 and is pivoted about the sliding rod 23 served as a fulcrum, so that each of the two transmission shafts 34 is moved downward by each of the two driving pieces 32. When each of the two transmission shafts 34 is moved downward, each of the two positioning pieces 31 is driven by each of the two transmission shafts 34 and is pivoted about each of the two guide shafts 33 served as a fulcrum, so that the locking teeth 314 of each of the two positioning pieces 31 are moved downward and detached from the locking grooves 124 of one of the two rails 12. On the contrary, when the linking lever 35 is moved downward, each of the two driving pieces 32 is driven by the linking lever 35 and is pivoted about the sliding rod 23 served as a fulcrum, so that each of the two transmission shafts 34 is moved upward by each of the two driving pieces 32. When each of the two transmission shafts 34 is moved upward, each of the two positioning pieces 31 is driven by each of the two transmission shafts 34 and is pivoted about each of the two guide shafts 33 served as a fulcrum, so that the locking teeth 314 of each of the two positioning pieces 31 are moved upward and locked into the locking grooves 124 of one of the two rails 12.

Figure 3:
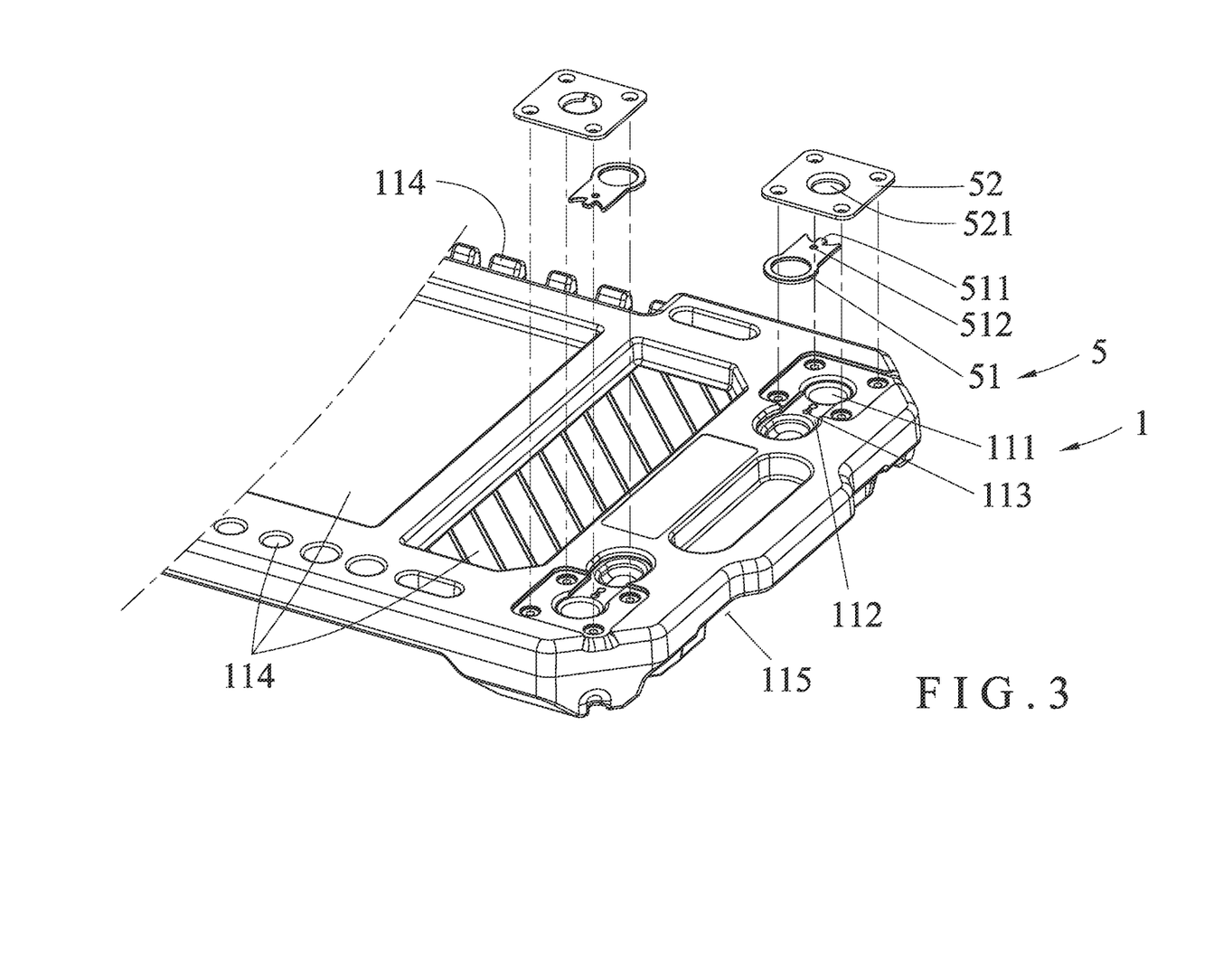
FIG. 3 is a partial exploded perspective view of the telescopic cart in accordance with the preferred embodiment of the present invention.
Figure 4:
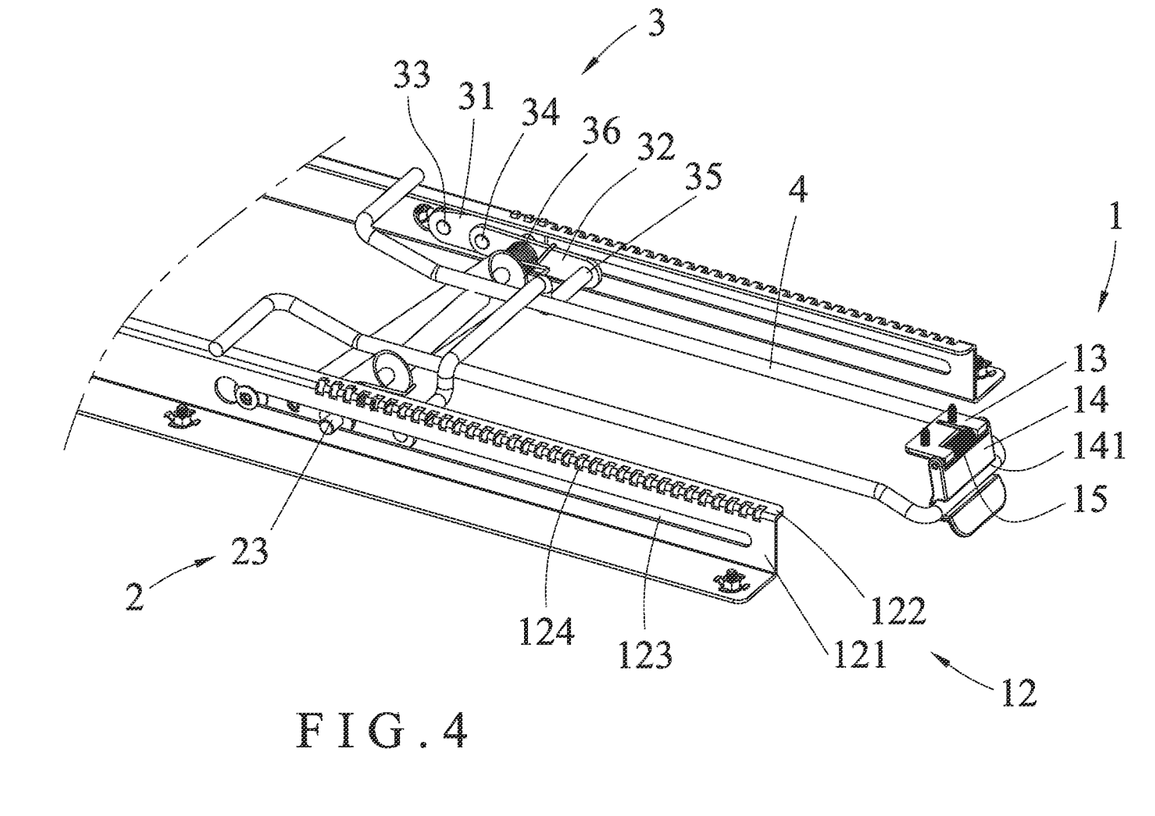
FIG. 4 is a partial perspective view of the telescopic cart in accordance with the preferred embodiment of the present invention.
Figure 5:
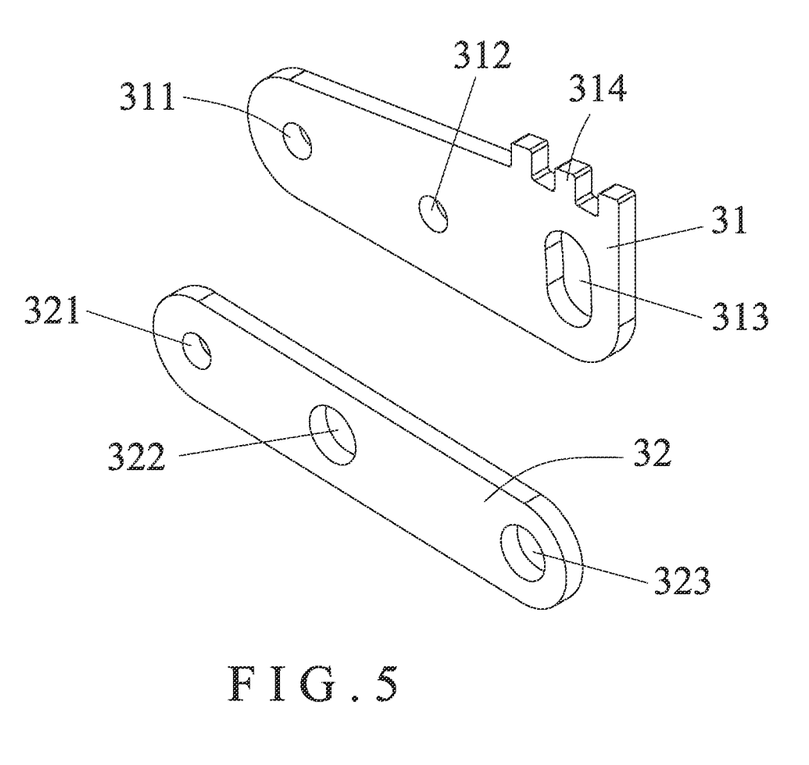
FIG. 5 is a perspective view of a positioning piece and a driving piece of the telescopic cart in accordance with the preferred embodiment of the present invention.

The limit unit 5 includes two locking plates 51 and two fixed plates 52. Each of the two locking plates 51 has an end provided with a locking portion 511 and has a bottom provided with a flange 512. Each of the two locking plates 51 is mounted in one of the two receiving grooves 112 of the storage body 11, with the flange 512 directed toward the one of the two receiving grooves 112. The flange 512 of each of the two locking plates 51 is locked in one of the two cavities 113 of one of the two receiving grooves 112. Each of the two fixed plates 52 is secured on the top of the storage body 11 and presses one of the two locking plates 51 so that each of the two locking plates 51 is allowed to slide in and will not be detached from one of the two receiving grooves 112. Each of the two fixed plates 52 is provided with a passage 521 aligning with one of the two insertion holes 111 of the storage body 11.

The handle 6 includes a U-shaped grip portion 61. The grip portion 61 has an outside provided with a plurality of locking holes 62. The grip portion 61 has two ends each extending through the passage 521 of one of the two fixed plates 52 and inserted into one of the two insertion holes 111 of the storage body 11. The locking portion 511 of each of the two locking plates 51 is locked into one of the locking holes 62 of the grip portion 61.

In practice, when the flange 512 of each of the two locking plates 51 is locked in one of the two cavities 113 of one of the two receiving grooves 112, the locking portion 511 of each of the two locking plates 51 is locked in one of the locking holes 62 of the grip portion 61, and when the flange 512 of each of the two locking plates 51 is locked in the other one of the two cavities 113 of one of the two receiving grooves 112, the locking portion 511 of each of the two locking plates 51 is unlocked and detached from one of the locking holes 62 of the grip portion 61. Thus, the handle 6 is positioned at different height.

Figure 1:
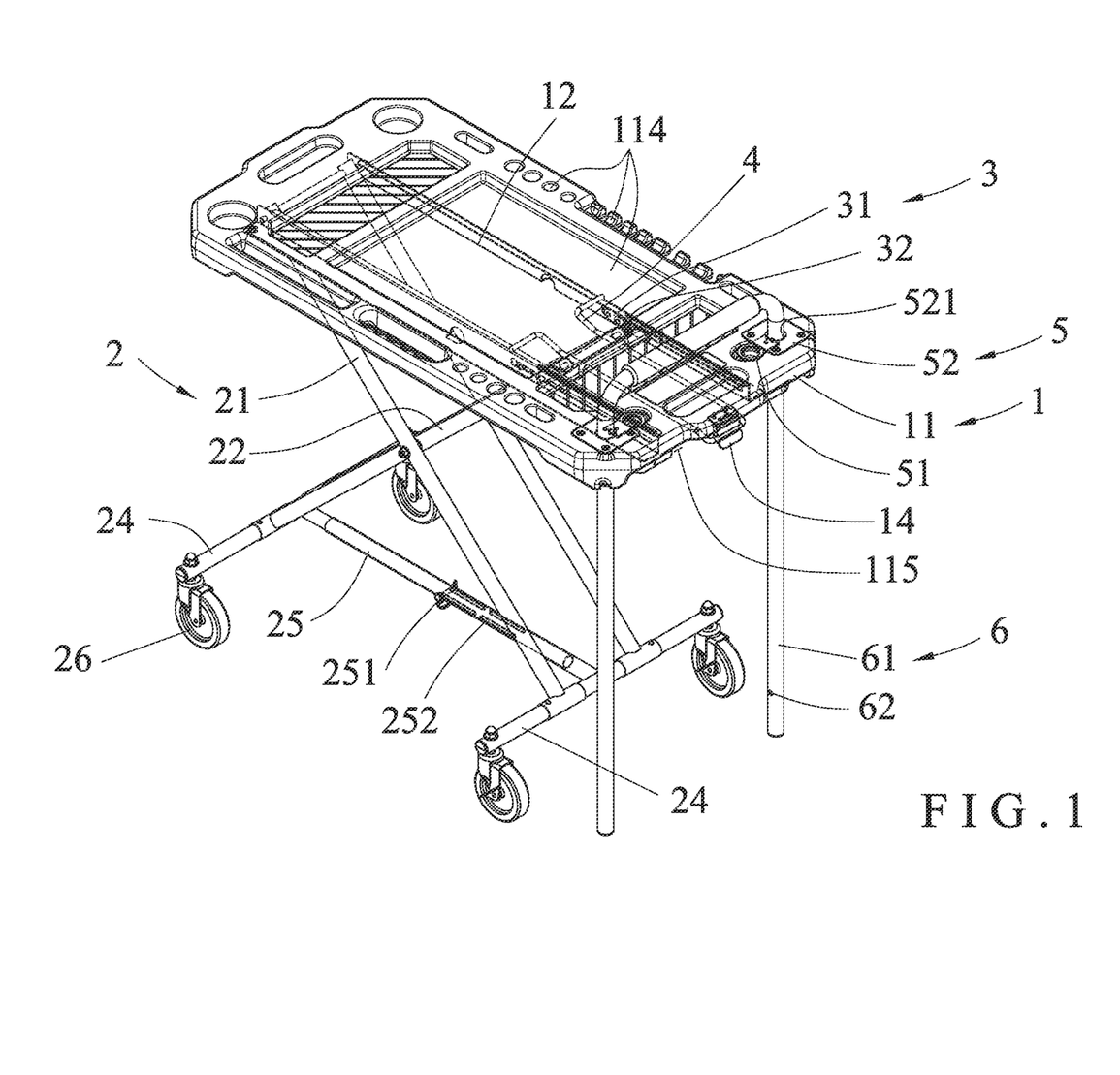
FIG. 1 is a perspective view of a telescopic cart in accordance with the preferred embodiment of the present invention.

Again referring to FIGS. 1-6, the storage portions 114 are used to place or store articles. The first supporting frame 21 and the second supporting frame 22 are positioned at different angles therebetween to lift or lower the storage unit 1, and the handle 6 is positioned at different height. As shown in FIG. 1, the first supporting frame 21 and the second supporting frame 22 are located at a smaller angle, so that the storage unit 1 is located at a higher position, and the handle 6 is positioned at a lower position relative to the storage unit 1, to facilitate the user taking the items placed on the storage unit 1.

Figure 7:
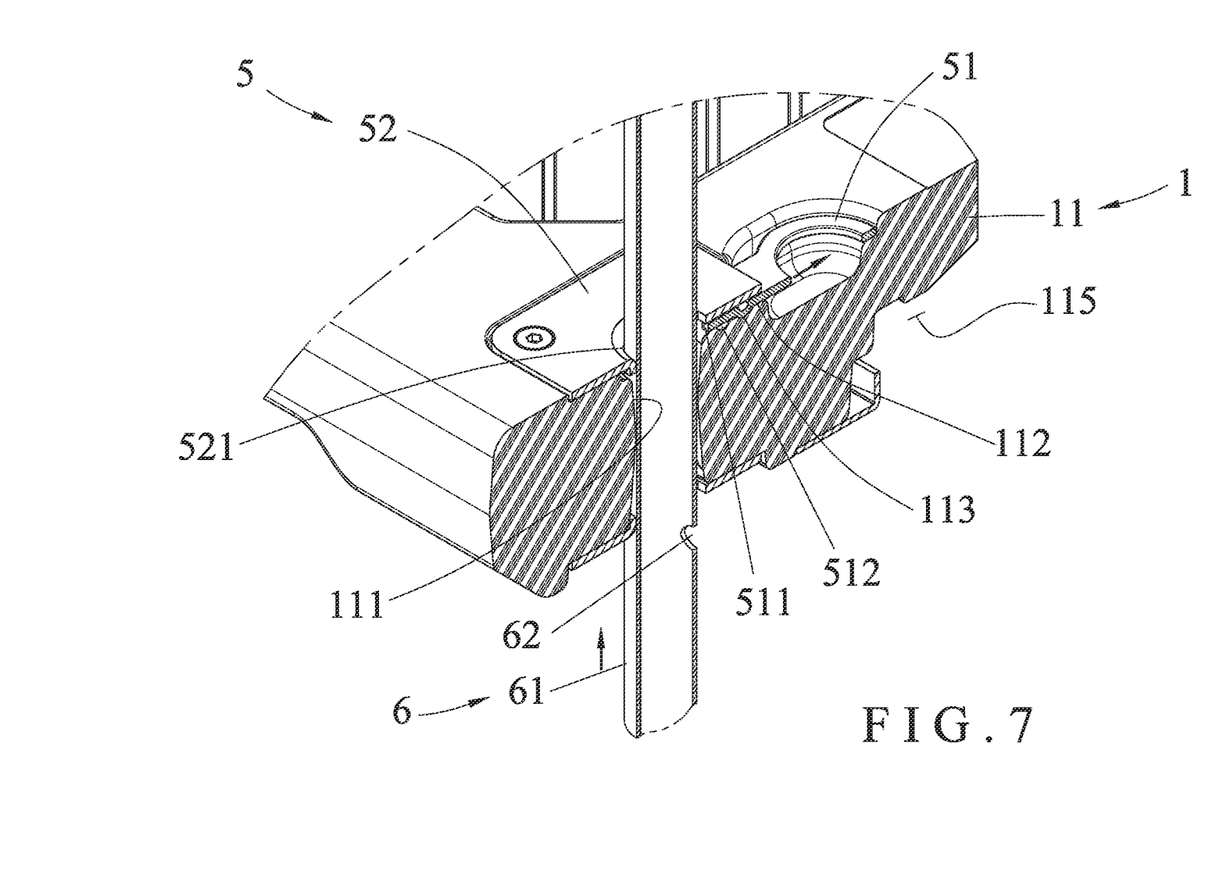
FIG. 7 is a schematic operational view of the telescopic cart as shown in FIG. 2 in adjustment.

In operation, referring to FIGS. 7-10 with reference to FIGS. 1-6, when each of the two locking plates 51 is pulled away from the handle 6 as shown in FIG. 7, the locking portion 511 of each of the two locking plates 51 is unlocked and detached from one of the locking holes 62 of the grip portion 61, so that the handle 6 is movable relative to the storage unit 1 to adjust the height of the handle 6. After the handle 6 is pulled to a higher position, each of the two locking plates 51 is pushed toward the handle 6, the locking portion 511 of each of the two locking plates 51 is locked in another one of the locking holes 62 of the grip portion 61, so that the handle 6 is positioned again and cannot be moved any more. Thus, the position of the handle 6 is adjusted according to the user's requirement.

Figure 8:
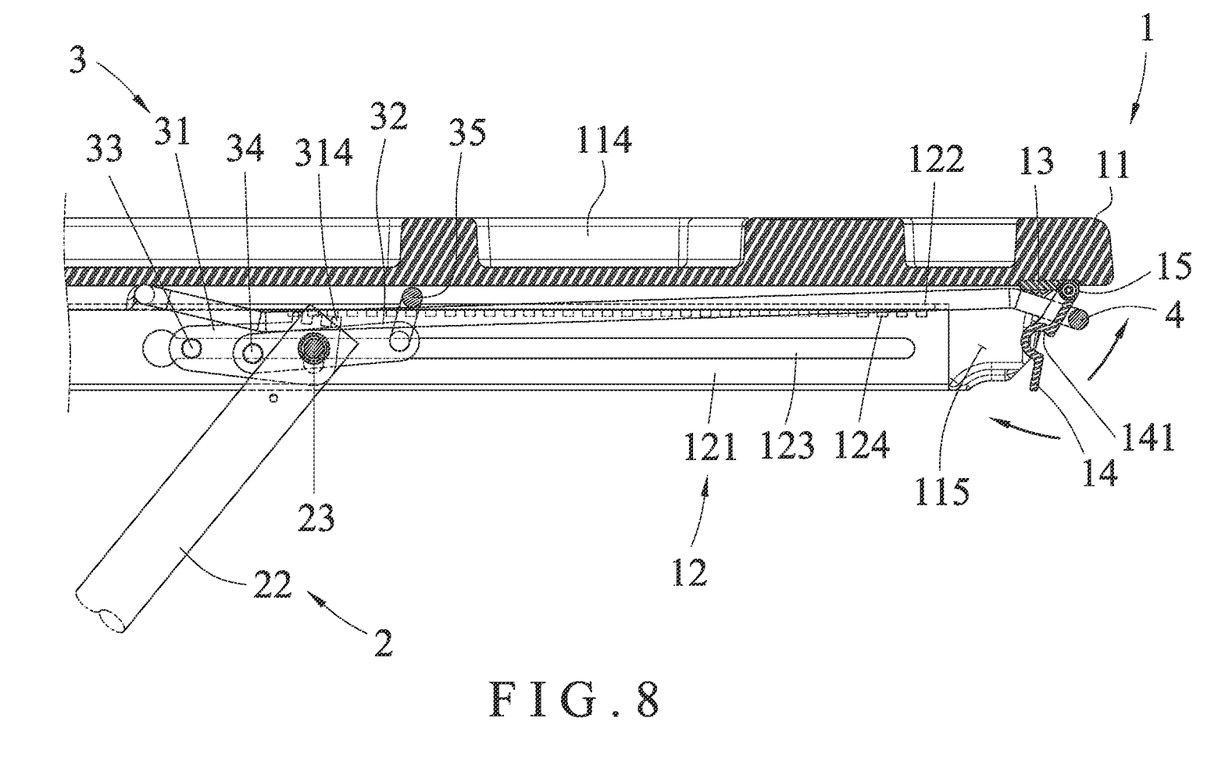
FIG. 8 is a partial cross-sectional view showing that the pressing control handle is pushed upward, and the locking teeth of each of the two positioning pieces are detached from the locking grooves of one of the two rails.

Subsequently, the control button 14 is pushed inward so that the pressing control handle 4 is detached from the recess 141 of the control button 14. Then, the pressing control handle 4 is pushed upward as shown in FIG. 8, so that the linking lever 35 and each of the two driving pieces 32 are driven to pivot upward about the sliding rod 23 served as a fulcrum, and each of the two positioning pieces 31 is driven to pivot downward about each of the two guide shafts 33 served as a fulcrum, so that the locking teeth 314 of each of the two positioning pieces 31 are moved downward and detached from the locking grooves 124 of one of the two rails 12. When each of the two driving pieces 32 is pivoted upward, each of the two positioning springs 36 is compressed to store a restoring force. In such a manner, the positioning unit 3 is unlocked from the storage unit 1 so that the support unit 2 is released, and the second supporting frame 22 is moved freely. At this time, when the storage unit 1 is pressed downward, the sliding rod 23 slides in the slideway 123 of each of the two rails 12 so that the second supporting frame 22 is pivoted relative to the first supporting frame 21 to increase the angle between the first supporting frame 21 and the second supporting frame 22, and the storage unit 1 is moved downward.

After the storage unit 1 is lowered to the required height, the force applied on the pressing control handle 4 is released, and each of the two driving pieces 32 is driven and moved downward by the restoring force of each of the two positioning springs 36, so that the linking lever 35 and each of the two driving pieces 32 are driven to pivot downward about the sliding rod 23, and each of the two positioning pieces 31 is driven to pivot upward about each of the two guide shafts 33, so that the locking teeth 314 of each of the two positioning pieces 31 are moved upward and locked into the locking grooves 124 of one of the two rails 12 again. At this time, when the linking lever 35 is moved downward, the pressing control handle 4 is driven downward by the linking lever 35 and locked into the recess 141 of the control button 14 again. Thus, the positioning unit 3 is locked onto the storage unit 1 to position the support unit 2.

Figure 9:
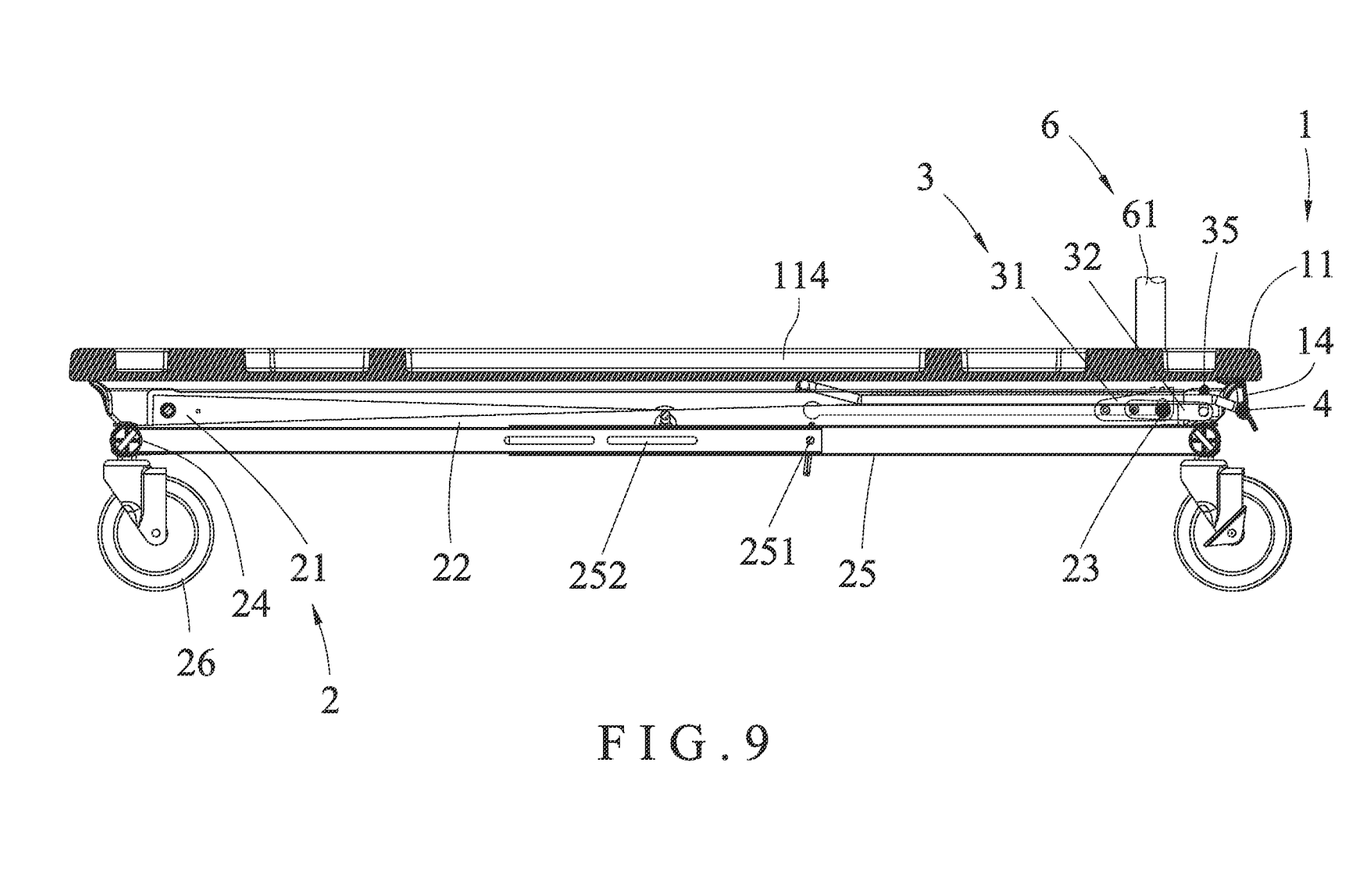
FIG. 9 is a cross-sectional view showing that the height of the telescopic cart is adjusted.
Figure 10:
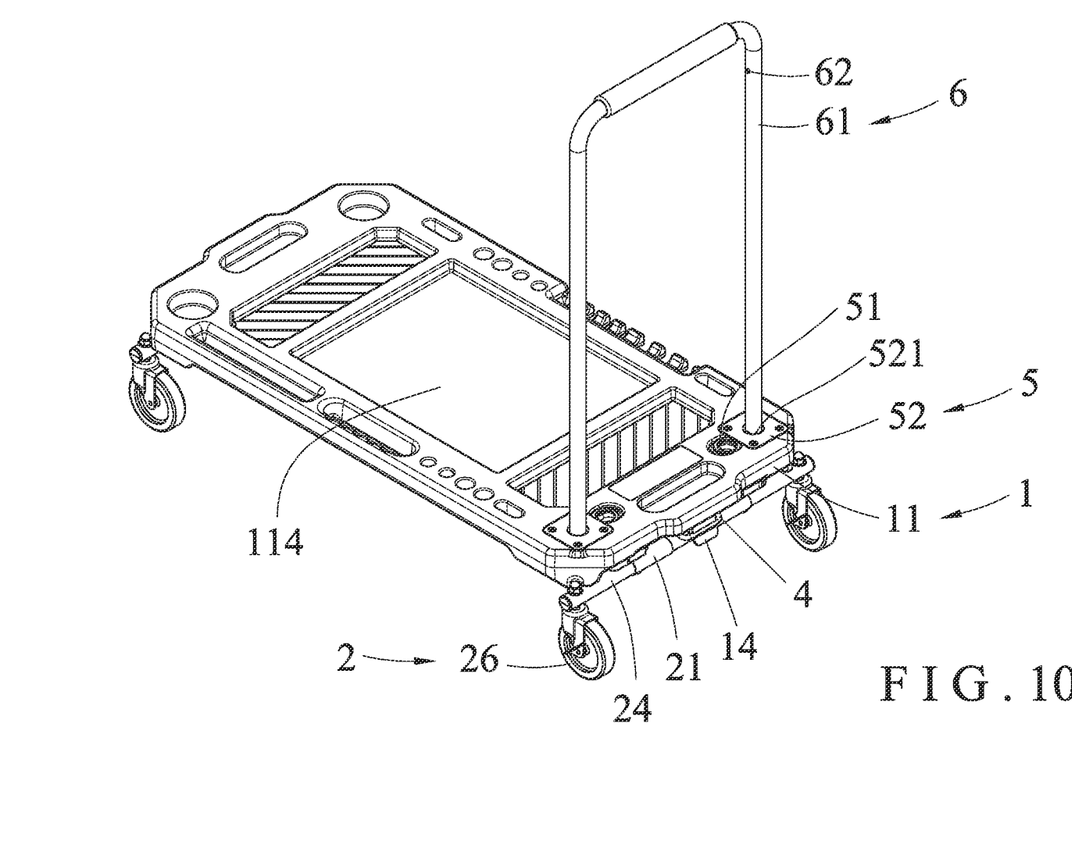
FIG. 10 is a perspective view showing that the height of the telescopic cart is adjusted.

In such a manner, the support unit 2 is folded, the storage unit 1 is lowered, and the handle 6 is lifted as shown in FIGS. 9 and 10, so that the telescopic cart is used to carry larger cargo. At this time, the telescopic cart is lowered to facilitate the user taking the items placed on the storage unit 1 by sitting or squatting.

It is appreciated that, when the locking teeth 314 of each of the two positioning pieces 31 fail to be locked into the locking grooves 124 of each of the two rails 12 due to elastic fatigue of each of the two positioning springs 36 during a long-term utilization, the pin 251 of one of the two mounting rods 25 is inserted into one of the pin holes 252 of the other one of the two mounting rods 25 to fix the first supporting frame 21 and the second supporting frame 22, to prevent the second supporting frame 22 from being pivoted relative to the first supporting frame 21.

Referring to FIG. 11, the storage body 11 is provided with two storage holes 116 extending in a lengthwise direction of the storage body 11. Thus, after the handle 6 is removed from the two insertion holes 111 of the storage body 11, the handle 6 is inserted into the two storage holes 116, to facilitate the user storing the handle 6.

Accordingly, the storage portions 114 of the storage unit 1 are used to place or store articles. When the pressing control handle 4 is locked in the recess 141 of the control button 14, the at least one locking tooth 314 of each of the two positioning pieces 31 is locked in the locking grooves 124 of one of the two rails 12, so that the first supporting frame 21 and the second supporting frame 22 are positioned with a determined angle therebetween, and the storage unit 1 is located at a determined height. In addition, when the user wishes to adjust the height of the storage unit 1, the control button 14 is pushed inward so that the pressing control handle 4 is detached from the recess 141 of the control button 14. Then, the pressing control handle 4 is pushed upward, so that the linking lever 35 and each of the two driving pieces 32 are driven to pivot about the sliding rod 23 served as a fulcrum, and each of the two positioning pieces 31 is driven to pivot about each of the two guide shafts 33 served as a fulcrum, so that the locking teeth 314 of each of the two positioning pieces 31 are detached from the locking grooves 124 of one of the two rails 12. Thus, the angle between the first supporting frame 21 and the second supporting frame 22 is adjusted freely to lift or lower the storage unit 1. After the storage unit 1 is lifted or lowered to the required height, the pressing control handle 4 is released and locked into the recess 141 of the control button 14 again, while the locking teeth 314 of each of the two positioning pieces 31 are locked into the locking grooves 124 of one of the two rails 12 again. Thus, the positioning unit 3 is locked onto the storage unit 1 to position the support unit 2. Further, the locking portion 511 of each of the two locking plates 51 is locked one of the locking holes 62 of the grip portion 61, so that the handle 6 is located at different height relative to the storage unit 1. Further, the height of the telescopic cart is adjusted according to the user's requirement. Thus, the first supporting frame 21 and the second supporting frame 22 are positioned with different angles defined therebetween, to adjust the height of the storage unit 1, thereby facilitating the users of different height taking the items placed on the storage unit 1 at different working positions.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A telescopic cart comprising:
a storage unit, a support unit, a positioning unit, a pressing control handle, a limit unit, and a handle;
wherein:
the storage unit includes a storage body, two rails, a base plate, a control button, and a torsion spring;
the storage body is provided with two insertion holes and two receiving grooves;
the two receiving grooves are located adjacent to the two insertion holes respectively;
each of the two receiving grooves is provided with two cavities which are in line with one of the two insertion holes;
the storage body has a top provided with a plurality of storage portions and a bottom provided with a bottom channel;
the two rails are secured to the bottom channel;
each of the two rails includes a main section and a secondary section extending from a top of the main section;
a predetermined angle is defined between the main section and the secondary section;
the main section is provided with a slideway;
the secondary section is provided with a plurality of locking grooves extending in a lengthwise direction of the slideway;

the base plate is secured in the bottom channel;
the control button is pivotally connected with the base plate;
the control button is provided with a recess;
the torsion spring is biased between the base plate and the control button;
the support unit includes a first supporting frame, a second supporting frame, a sliding rod, two connecting rods, and two mounting rods;
the first supporting frame and the second supporting frame are pivotally connected;
the first supporting frame has a top pivotally connected with the two rails;
the sliding rod extends through a top of the second supporting frame and is inserted into the slideway of each of the two rails;
one of the two connecting rods is pivotally connected with the first supporting frame, and the other one of the two connecting rods is pivotally connected with the second supporting frame;
each of the two connecting rods is provided with a plurality of casters;
the two mounting rods are arranged telescopically;
each of the two mounting rods is secured to one of the two connecting rods;
the positioning unit includes two positioning pieces, two driving pieces, two guide shafts, two transmission shafts, a linking lever, and two positioning springs;
each of the two positioning pieces is arranged beside one of the two rails;
each of the two positioning pieces is provided with a shaft hole, a first through hole, and a limit slot which are arranged serially;
each of the two positioning pieces has an upper edge provided with at least one locking tooth;
each of the two guide shafts extends through the shaft hole of one of the two positioning pieces and is inserted into the slideway of one of the two rails;
the sliding rod extends through the limit slot of each of the two positioning pieces;
the limit slot of each of the two positioning pieces has a length more than the diameter of the sliding rod;
each of the two driving pieces is arranged beside one of the two positioning pieces;
each of the two driving pieces is provided with a second through hole, an aperture, and a mounting hole which are arranged serially;
each of the two transmission shafts extends through the second through hole of one of the two driving pieces and the first through hole of one of the two positioning pieces;
the sliding rod extends through the aperture of each of the two driving pieces;
the linking lever has two ends secured in the mounting hole of each of the two driving pieces respectively;
each of the two positioning springs is mounted on the sliding rod and has a first end pressing an upper edge of one of the two driving pieces and a second end pressing a top of the bottom channel;
each of the two positioning springs applies an elastic force which forces the at least one locking tooth of each of the two positioning pieces into the locking grooves of one of the two rails to position the support unit;
the pressing control handle is pivotally mounted in the bottom channel of the storage body and extends between the sliding rod and the linking lever;
the linking lever presses the pressing control handle downward so that the pressing control handle is locked into the recess of the control button;
the limit unit includes two locking plates and two fixed plates;
each of the two locking plates has an end provided with a locking portion and has a bottom provided with a flange;
each of the two locking plates is mounted in one of the two receiving grooves of the storage body;
the flange of each of the two locking plates is locked in one of the two cavities of one of the two receiving grooves;
each of the two fixed plates is secured on the top of the storage body and presses one of the two locking plates;
each of the two fixed plates is provided with a passage aligning with one of the two insertion holes of the storage body
the handle includes a U-shaped grip portion;
the grip portion has an outside provided with a plurality of locking holes;
the grip portion has two ends each extending through the passage of one of the two fixed plates and inserted into one of the two insertion holes of the storage body; and
the locking portion of each of the two locking plates is locked into one of the locking holes of the grip portion.

2. The telescopic cart as claimed in claim 1, wherein the storage body is provided with two storage holes extending in a lengthwise direction of the storage body.

3. The telescopic cart as claimed in claim 1, wherein one of the two mounting rods is provided with a plurality of pin holes, and the other one of the two mounting rods is provided with a detachable pin selectively extending through one of the pin holes.

* * * * *